US007791457B2

(12) United States Patent
Ghabra et al.

(10) Patent No.: US 7,791,457 B2
(45) Date of Patent: Sep. 7, 2010

(54) METHOD AND APPARATUS FOR AN ANTI-THEFT SYSTEM AGAINST RADIO RELAY ATTACK IN PASSIVE KEYLESS ENTRY/START SYSTEMS

(75) Inventors: Riad Ghabra, Dearborn Heights, MI (US); Yi Luo, Ypsilanti, MI (US); John Nantz, Brighton, MI (US); Ronald O. King, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 935 days.

(21) Appl. No.: 11/639,915

(22) Filed: Dec. 15, 2006

(65) Prior Publication Data
US 2008/0143500 A1 Jun. 19, 2008

(51) Int. Cl.
*B60R 25/10* (2006.01)
*G05B 19/00* (2006.01)
*G05B 23/00* (2006.01)
*G06F 7/00* (2006.01)
*G06F 7/04* (2006.01)
*G08B 29/00* (2006.01)
*G08C 19/00* (2006.01)
*H04B 1/00* (2006.01)
*H04B 3/00* (2006.01)
*H04Q 1/00* (2006.01)
*H04Q 9/00* (2006.01)

(52) U.S. Cl. ................................. 340/426.36; 340/5.61
(58) Field of Classification Search ............ 340/426.36, 340/5.61
See application file for complete search history.

(56) References Cited

U.S. PATENT DOCUMENTS 6,218,932 B1   4/2001   Stippler
(Continued)

FOREIGN PATENT DOCUMENTS

DE   101 06 736   2/2003
(Continued)

OTHER PUBLICATIONS

Some Attacks Against Vehicles' Passive Entry Security Systems and Their Solutions, Ansaf Ibrahem Alrabady and Syed Musad Mahmud, Mar. 2, 2003, IEEE Transactions on Vehicle Technology vol. 52, No. 2.

*Primary Examiner*—Benjamin C Lee
*Assistant Examiner*—Andrew Bee
(74) *Attorney, Agent, or Firm*—MacMillan, Sobanski & Todd, LLC

(57) ABSTRACT

An apparatus and method is provided for identifying unauthorized access to a vehicle having a keyless-passive entry system. An interrogation signal is broadcast from a vehicle based transmission device. The interrogation signal includes a first pulse transmitted at a first amplitude and a second pulse transmitted at a second amplitude where the second amplitude is greater than the first amplitude by at least a predetermined difference threshold. The interrogation signal is received by a portable communication device. A determination is made whether the second amplitude of the second pulse is greater than the first amplitude of the first pulse by a predetermined difference threshold. A determination is made that the interrogation signal is an authorized interrogation signal in response to the determination that the interrogation signal includes the first pulse transmitted at the first amplitude following by the second pulse transmitted at the second amplitude where the second amplitude is greater than the first amplitude by at least a predetermined difference threshold.

20 Claims, 4 Drawing Sheets

U.S. PATENT DOCUMENTS

| | | |
|---|---|---|
| 6,617,961 B1 * | 9/2003 | Janssen et al. ............... 340/5.8 |
| 6,850,148 B2 | 2/2005 | Masudaya |
| 6,960,981 B2 | 11/2005 | Blatz |
| 6,970,679 B2 | 11/2005 | Blatz et al. |
| 6,980,686 B2 | 12/2005 | Kuwabara |
| 6,992,568 B2 | 1/2006 | Perraud et al. |
| 7,034,656 B2 * | 4/2006 | Buchner .................... 340/5.61 |
| 7,098,769 B2 | 8/2006 | Ott |
| 7,292,137 B2 * | 11/2007 | Gilbert et al. ............ 340/426.3 |
| 7,545,254 B2 * | 6/2009 | Brillon ...................... 340/5.61 |
| 2003/0071717 A1 | 4/2003 | Hagl et al. |
| 2006/0044108 A1 | 3/2006 | Nowottnick |
| 2006/0077042 A1 | 4/2006 | Hock |
| 2006/0255909 A1 | 11/2006 | Pavatich |

FOREIGN PATENT DOCUMENTS

| | | |
|---|---|---|
| EP | 1 304 661 | 4/2003 |
| EP | 1884900 | 2/2008 |
| GB | 234 0 169 | 2/2000 |
| WO | 01/25060 | 4/2001 |
| WO | 2004/114227 | 12/2004 |

* cited by examiner

METHOD AND APPARATUS FOR AN ANTI-THEFT SYSTEM AGAINST RADIO RELAY ATTACK IN PASSIVE KEYLESS ENTRY/START SYSTEMS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general to vehicular remote keyless entry systems, and more specifically, to vehicular passive entry keyless entry systems.

2. Background of Related Art

Remote keyless entry (RKE) systems are well known in the automotive industry for remotely accessing vehicles without the use of a key. RKE systems may be characterized as active or passive. In an active entry system, a user must activate a switch or pushbutton on a remote transmitter in order to have a desired remote function performed, such as locking or unlocking the vehicle doors or de-latching the trunk. In contrast, a passive entry system does not require a user to activate a switch or pushbutton on the remote transmitter in order to have a desired remote function performed.

In passive entry systems, a remote receiver and transmitter (or transceiver) is carried with the user in a portable communication device such as a "fob" or a "card". The portable communication device when successfully challenged transmits a radio frequency (RF) signal to a module within the vehicle for performing a variety of remote vehicle function such door lock/unlock, enabling engine start, or activating external/internal lighting. Passive entry systems include a transmitter and receiver (or transceiver) in an electronic control module disposed within the vehicle. The transceiver is typically in communication with one or more devices (e.g., door lock mechanism) for determining when a request for actuation of a device is initiated (e.g., lifting a door handle) by a user.

Upon sensing the request for actuation, the transceiver broadcasts a passive entry interrogating signal. The fob upon receiving the interrogating signal from the ECU, the portable communication device determines if the interrogating signal is valid. If it is determined a valid signal, then the fob automatically broadcasts an output signal which includes an encrypted or rolling identification code to the electronic control module. The electronic module thereafter determines the validity of the output signal and generates a signal to the device to perform an operation (e.g., the door lock mechanism to unlock the door) if the output signal is determined valid.

Passive entry systems are susceptible to security threats such as relay attack. Relay attack occurs when two thieves work in cooperation to gain unauthorized access to a vehicle by initiating and relaying the communication signals between the vehicle and a user. This occurs when a first thief triggers the actuation of an interrogation signal, for example, by lifting the vehicle door handle. The passive entry system in the vehicle broadcasts the interrogation signal as it is expected the fob is in the vicinity of a user lifting the door handle. The first thief who is in range of the broadcast interrogation signal carries a repeater which receives the interrogation signal and retransmits the interrogation signal to a second thief in close proximity to a user having an authorized fob capable of broadcasting a response signal for unlocking the vehicle. The re-transmitted signal is typically a UHF signal which can be transmitted over a long range distance as opposed to a low frequency (LF) signal. The second thief also carrying a repeater device receives the UHF signal from the first thief. The signal is decoded and the re-transmitted as a LF signal to the user carrying the authorized fob. The fob receives the re-transmitted signal from the second thief and responds to the received interrogation signal accordingly. The second thief receives the response signal having the valid coded information therein and re-transmits the signal to the first thief. The first thief receives the authenticated response signal and transmits it to the vehicle. The vehicle receives the response signal, validates the signal, and unlocks the vehicle doors.

In view of the above, a need exists for an apparatus and method system for deterring a relay attack upon a passive entry system of a vehicle.

BRIEF SUMMARY OF THE INVENTION

The present invention has the advantage of broadcasting an interrogation signal having a portion of the interrogation signal being broadcast at a first amplitude, and a second portion of the interrogation signal being broadcast at a second amplitude. The transmission of the signal at different amplitudes deters repeater devices for a relay-attack system from reproducing the original interrogation signal transmitted between a vehicle based transmission device and a portable communication device.

In one aspect of the present invention, a method is provided for identifying unauthorized access to a vehicle having a keyless-passive entry system. An interrogation signal is broadcast from a vehicle based transmission device. The interrogation signal includes a first pulse transmitted at a first amplitude and a second pulse transmitted at a second amplitude where the second amplitude is greater than the first amplitude by at least a predetermined difference threshold. The interrogation signal is received by a portable communication device. A determination is made whether the second amplitude of the second pulse is greater than the first amplitude of the first pulse by a predetermined difference threshold. A determination is made that the interrogation signal is an authorized interrogation signal in response to the determination that the interrogation signal includes the first pulse transmitted at the first amplitude following by the second pulse transmitted at the second amplitude where the second amplitude is greater than the first amplitude by at least a predetermined difference threshold.

In yet another aspect of the present invention, a keyless-passive entry system is provided for identifying unauthorized access to a vehicle. The system includes a portable communication device carried by a user of a vehicle for accessing entry to the vehicle. A vehicle based transmission device is in communication with the portable communication device. An interrogation signal is broadcast by the vehicle based transmission device as a low frequency signal. The interrogation signal includes a first pulse transmitted at a first amplitude followed by a second pulse transmitted at a second amplitude where the second amplitude is greater than the first amplitude by a predetermined difference threshold. The interrogation signal is received by the portable communication device. The portable communication device determines the interrogation signal is an authorized interrogation signal in response to the determination that the second amplitude of the second pulse is greater than the first amplitude of the first pulse by at least the predetermined difference threshold.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
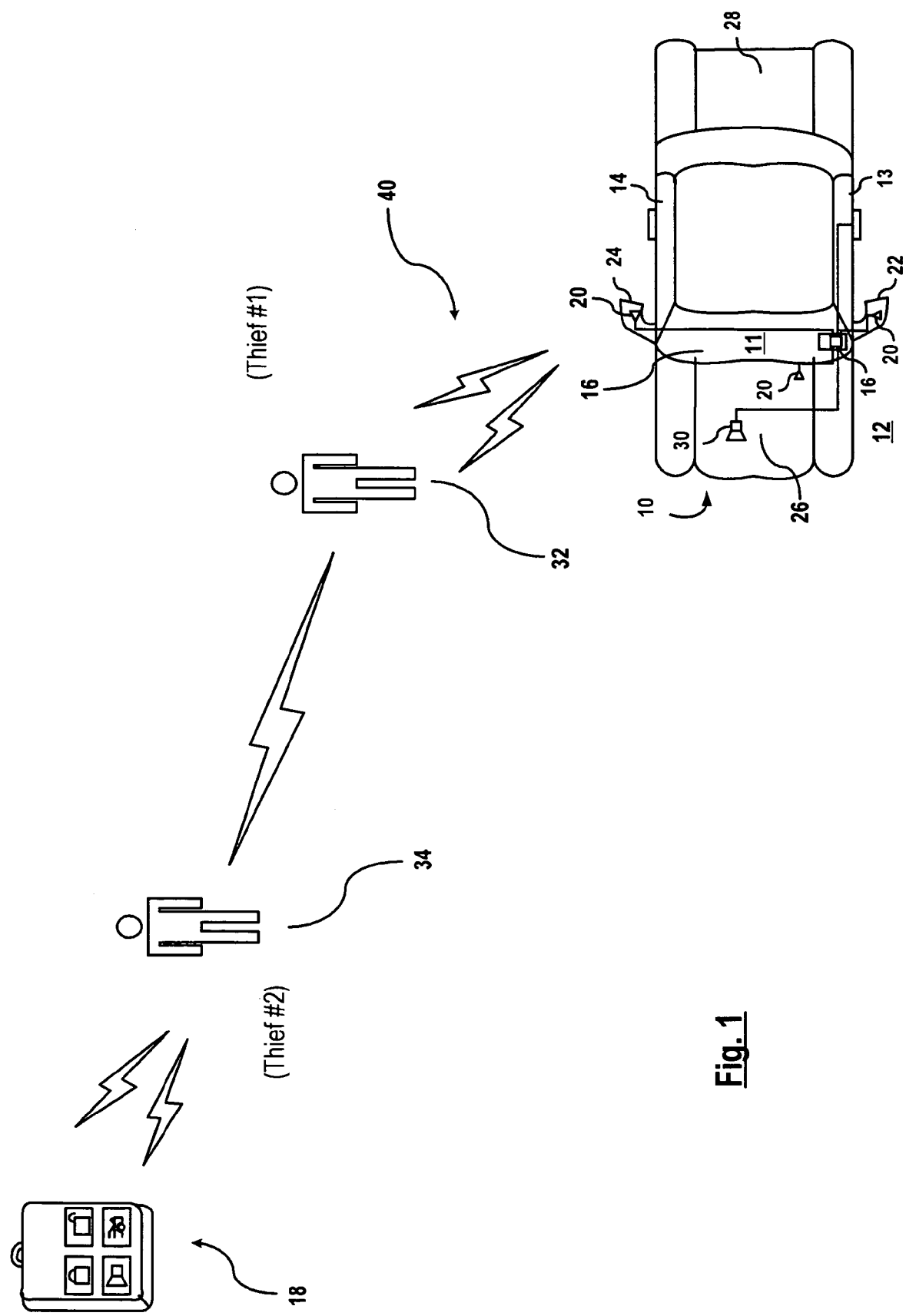
FIG. 1 illustrates a schematic diagram of a keyless passive entry system subject to a relay-attack on a vehicle.

Referring to FIG. 1, there is shown a prior art passive entry/start system. A vehicle 10 includes an interior region 11 and an exterior region 12. A driver side vehicle door 13 and a passenger side vehicle door 14 provide a secured entry barrier between the interior region 11 and the exterior region 12 of the vehicle, and can be automatically unlocked by a passive entry system for allowing the user access to the interior region 11.

A vehicle-based electronic control unit (ECU) 16 for controlling passive entry functions is mounted within the vehicle structure of the vehicle 10 such as in a junction box 18 of the vehicle 10. The ECU 16 is coupled to a plurality of low frequency (LF) antennas 20 disposed at various locations of the vehicle for communicating with a portable communication device 18 that is typically carried by a user of the vehicle 10 for allowing the user access to the interior region 11 of the vehicle. The plurality of LF antennas 20 may be located in a driver side vehicle door 13, a passenger side vehicle door 14, a driver side mirror 22, a passenger side mirror 24, an engine compartment 26, or a trunk compartment 28. The plurality of LF antennas 20 are coupled to the ECU 16 via respective communication lines.

The portable communication device 18 is a portable electronic device that is capable of receiving an interrogation signal, such as a wake-up signal, from the ECU 16 and is responsive to the wake-up signal by broadcasting a response signal to the ECU 16. Preferably, the portable communication device 18 is a remote keyless entry (RKE) fob. The RKE fob typically broadcasts UHF signals to a vehicle-based ECU 16 in response to a user actuating one of the plurality of switches commonly disposed on the face of the RKE fob for remotely actuating various vehicle entry functions such as unlocking and locking the vehicle doors 13 and 14, unlatching a trunk latch, or for activating and deactivating a vehicle alarm system 30.

In a relay-attack event, a first thief 32 actuates the passive entry system by performing an initiation event such as lifting a door handle. The first thief 32 carries a first device, such as a first repeater device (not shown), for receiving the LF signal broadcast by the ECU 16 via the plurality of LF antennas 20. LF signals are typically broadcast at 125 KHz. The first device demodulates the received interrogation signal 40 and attempts to reproduce the interrogation signal 40 as a UHF signal (e.g., 800 MHz). The interrogation signal 40 is transmitted as a UHF signal to a second repeater device carried by a second thief 34. The second thief is positioned in close proximity to a user carrying an authorizing portable communication device 18. The signal transmitted by the first thief 32 is transmitted as a UHF signal so that the communication signal has sufficient signal strength for communicating the reproduced signal over a large distance (i.e., larger than that what can be achieved by a LF signal) to the second thief 34. As a result, the user carrying the authorizing portable communication device 18 need not be in close proximity to the vehicle 10; rather, the user may be at a distance far away from the vehicle 10 such that the first thief's actions at the vehicle 10 are unobservable to the user carrying the authenticating portable communication device 18.

The second repeater device carried by the second thief 34 receives and demodulates the UHF signal in an attempt to reproduce the original interrogation signal 40. In response to demodulating the UHF signal, the second repeater device carried by the second thief 34 modulates the data of the received signal and transmits the data as a reproduced LF signal to the portable communication device 18 in an attempt to duplicate the original LF signal broadcast by the ECU 16. The reproduced LF signal from the second thief 34 is received by the nearby portable communication device 18. If the data of the received LF signal matches the authenticating data stored in portable communication device 18, a response signal is transmitted by the portable communication device 18. The second repeater device carried by the second thief 34 receives the response signal transmitted by the portable communication device 18. The response signal is demodulated and re-transmitted as a reproduced response signal to the first thief 32. The repeater device carried by the first thief 32 receives the signal and broadcasts the reproduced response signal to ECU 16 of the vehicle 10 for obtaining access to the vehicle 10.

In the event the LF communication signal broadcast by the second thief 34 to the portable communication device 18 does not match the authenticating data stored in the memory of the portable communication device 18, then the portable communication device 18 remains non-responsive and the relay-attack is thwarted. It is understood that the term passive entry system herein includes passive engine start systems in which this anti-theft system may be applied to.

Figure 2:
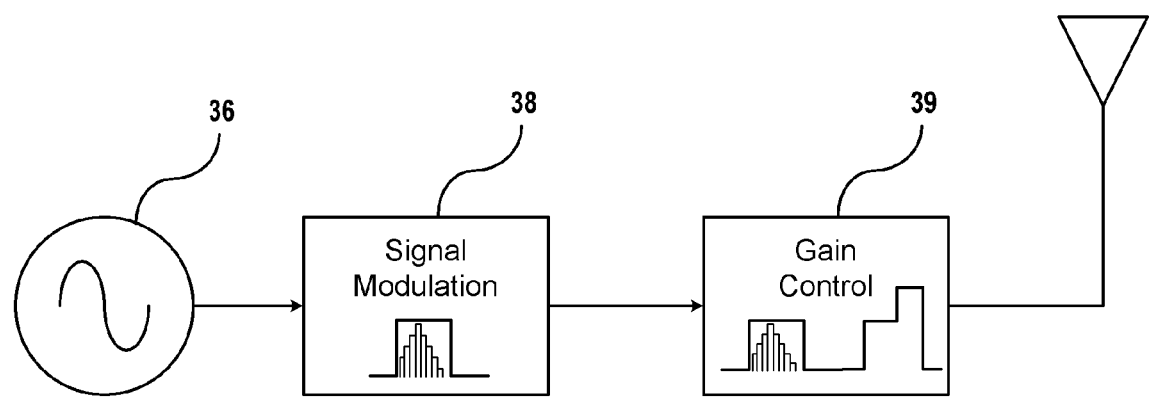
FIG. 2 illustrates a block diagram for generating an interrogation signal for deterring a relay-attack on a passive entry system.

FIG. 2 illustrates a block diagram for generating an interrogation signal for deterring a relay attack on the passive entry system. The interrogation signal is generated by a signal generator, shown at block 36. The interrogation signal is typically a continuous waveform signal that includes a wake-up signal having a preamble followed by a patterned data signal. The signal is modulated and transmitted at a predetermined carrier frequency as shown at block 38. In prior art systems, the thief needs only to decode and duplicate the patterned data portion of the received LF signal. If the patterned data matches the data stored in the portable communication device 18, the portable communication device 18 is woken and responds by transmitting an encrypted UHF response signal. To deter a relay-attack from occurring, a gain control, as shown in block 39, is applied to the interrogation signal at predetermined time periods so that a portion of the interrogation signal is transmitted at two different non-zero amplitudes.

Figure 3:
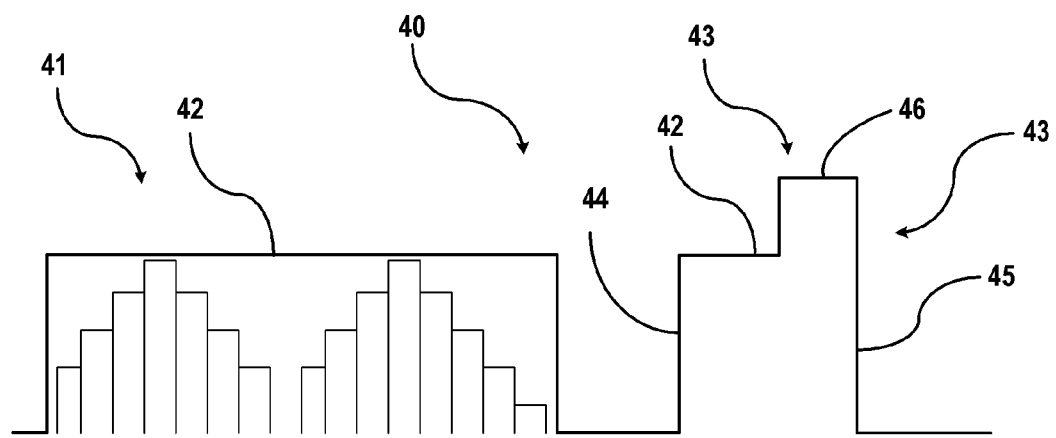
FIG. 3 illustrates an interrogation signal generated by the keyless passive entry system according to a first preferred embodiment of the present invention.

FIG. 3 illustrates the gain control applied to the interrogation signal for deterring a relay attack in a first preferred embodiment. As shown in FIG. 2, the data portion 41 of the interrogation signal 40 is modulated at a first amplitude 42. A non-data portion 43 of the continuous waveform signal, referred to as the deterrent portion of the interrogation signal 40, is broadcast at two non-zero amplitudes. A first pulse 44 of the deterrent portion of the interrogation signal 40 is transmitted at the first amplitude 42. Gain control is applied to a second pulse 45 of the deterrent portion of the interrogation signal 40 for increasing the power level to a second amplitude 46. Preferably, the second amplitude 46 is only slightly higher than the first amplitude 42. This increase in the amplitude of the power a portion of the interrogation signal 40 deters the repeating devices from duplicating the interrogation signal 40. Since the interrogation signal 40 is transmitted as a digital signal, the repeater devices sense for either pulsed zero bit or a pulsed high voltage bit. As a result, the change in power from the first amplitude 42 to second amplitude 46 is not detected. That is, repeater devices do not sense for power changes within the interrogation signal; rather, the repeater device's objective is to duplicate the data transmitted within the interrogation signal 40. The increased amplitude in the second pulse 46 of the deterrent portion of the interrogation signal 40 provides a distinguishing characteristic that is not detectable by the repeater devices. The first amplitude 42 and the second amplitude 46 of the interrogation signal 40 when received by the repeater devices are indistinguishable from each other as seen by the repeater devices. The signals reproduced by the repeater devices will generate a reproduced signal having a uniform amplitude as opposed to a first pulse 44 transmitted at the first amplitude 42 followed by the second pulse 46 transmitted at an increased second amplitude 46.

The portable communication device 18 (shown in FIG. 1) includes an amplitude sensing circuit that is responsive to the amplitude of the transmitted signals and responds accordingly to the interrogation signal 40 having the first amplitude 42 and the increased second amplitude 46. The amplitude sensing circuit of the portable communication device 18 will sample the received interrogation signal at predetermined time intervals to determine whether the interrogation signal includes the increased second amplitude 46. Validation of the interrogation signal will be based on validating the portion of the interrogation signal having the first amplitude 42 followed by the increased second amplitude 46 in addition to validating the data contained in the interrogation signal. Preferably, the amplitude sensing circuit only measures the relative amplitude such that a determination can be made based on whether the second amplitude 46 is greater than the first amplitude 42 by a predetermined difference threshold. This alleviates the requirement of integrating costly components in the passive entry device for measuring respective absolute values of the amplitudes. Alternatively, the amplitude sensing circuit may include circuitry for measuring absolute values of the amplitudes.

Figure 4:
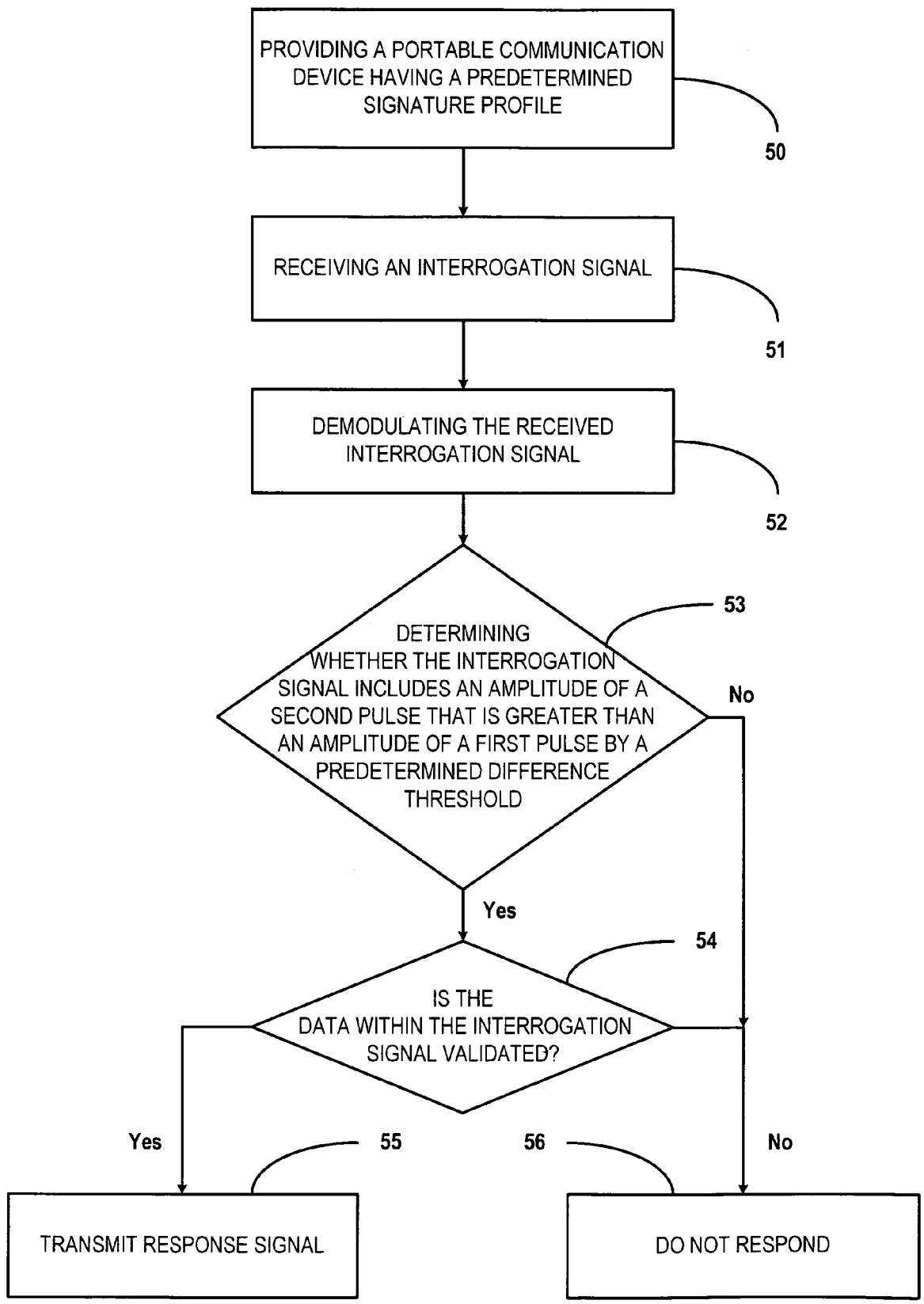
FIG. 4 illustrates flowchart of a method for detecting a relay-attack on a vehicle according to a first preferred embodiment of the present invention.

FIG. 4 illustrates a method for preventing a relay-attack in a keyless-entry passive entry system. In step 50, portable communication device is provided for receiving an interrogation signal. The portable communication device is responsive to an authorized interrogation signal. In step 51, the portable communication device receives an interrogation signal. In step 52, the portable communication device demodulates the received interrogation signal. In step 53, the portable communication device determines whether the interrogation signal includes a first pulse transmitted at the first amplitude followed by the second pulse transmitted at n second amplitude where the second amplitude is greater than the first amplitude by at least a predetermined difference threshold. If the determination is made that the interrogation signal does not include the second pulse having an amplitude greater than an amplitude of the first by a predetermined difference threshold, then the portable communication device does not respond to the interrogation signal in step 56. If the determination is made that the interrogation signal includes a second pulse having an amplitude greater than the amplitude of the first pulse by a predetermined difference threshold, then a determination is made, in step 54, whether the data within the interrogation signal is validated. In step 54, if the determination is made that the data within the interrogation signal is not validated, then the portable communication device remains non-responsive to the interrogation signal, in step 56. If the determination is made, in step 54, that the data within the interrogation signal is validated, then a response signal is sent to the vehicle to actuate the passive entry device in step 55. It should be understood that in alternative embodiments, validation of the data within the interrogation signal may be performed concurrently or after a determination is made whether the second amplitude of the second pulse is greater than the first amplitude of the first pulse by at least the predetermined difference threshold.

Figure 5:
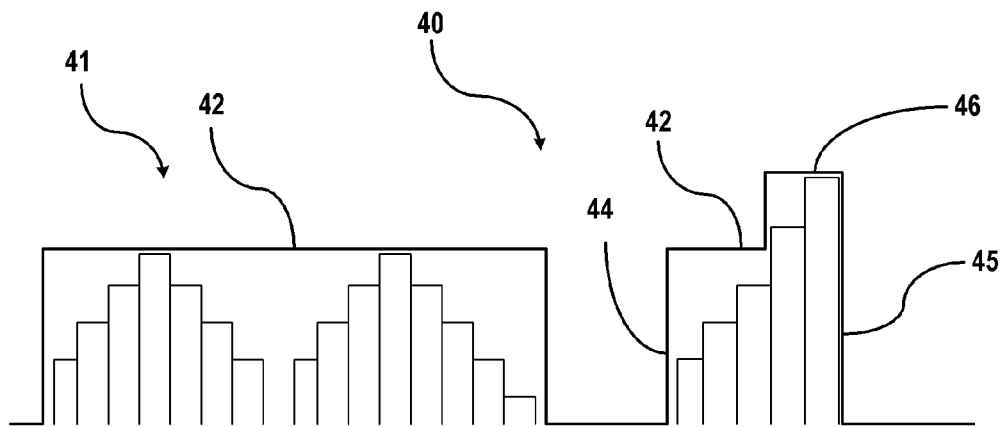
FIG. 5 illustrates an interrogation signal generated by the keyless passive entry system according to a second preferred embodiment of the present invention.

FIG. 5 illustrates a second preferred embodiment of the broadcast interrogation signal 40. The first pulse 44 transmitted at the first amplitude 42 followed by the second pulse 45 transmitted at the increased second amplitude 46 includes data. Moreover, the second pulse 45 transmitted at the increased second amplitude 46 may be transmitted as part of the data portion 41 of the interrogation signal 40 as opposed to delaying the transmission between the data portion 41 and the first pulse 44 transmitted at the first amplitude 42.

Figure 6:
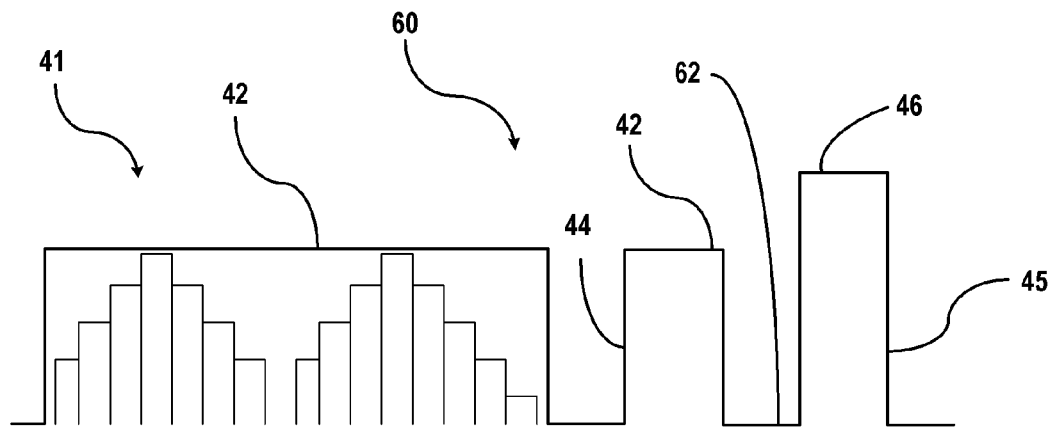
FIG. 6 illustrates an interrogation signal generated by the keyless passive entry system according to a third preferred embodiment of the present invention.

FIG. 6 illustrates a third preferred embodiment of an interrogation signal for deterring the relay attack. An interrogation signal 60 includes the first pulse 44 transmitted at the first amplitude 42 followed by a delay 62. The second pulse 45 transmitted at the increased second amplitude 46 is transmitted after the delay 62. The portable communication device 18 (shown in FIG. 1) will sample the interrogation signal at a predetermined time intervals which takes into account the delay 62 between the first pulse 44 transmitted at the first amplitude 42 and the second pulse 45 transmitted at the increased second amplitude 46.

Figure 7:
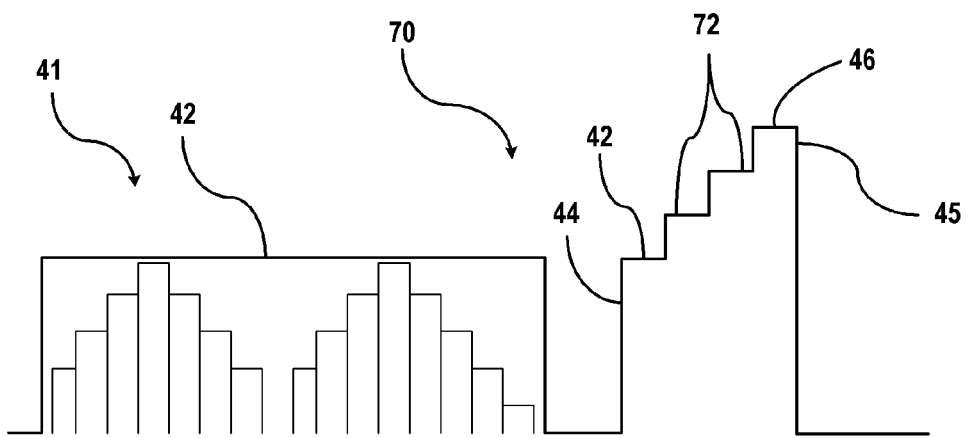
FIG. 7 illustrates an interrogation signal generated by the keyless passive entry system according to a fourth preferred embodiment of the present invention.

FIG. 7 illustrates a fourth preferred embodiment of an interrogation signal for deterring the relay attack. An interrogation signal 70 includes a plurality of intermediate pulses 72 transmitted between the first pulse 44 and the second pulse 45. Each of the respective intermediate pulses 72 are transmitted at a respective amplitudes so that each amplitude of a intermediate pulse is greater than an amplitude of a respective previous pulse by a second predetermined difference threshold. As a result, the deterrent portion of the interrogation signal 70 resembles an increasing ramp signal.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for identifying unauthorized access to a vehicle having a keyless-passive entry system, the method comprising the steps of:
broadcasting an interrogation signal from a vehicle based transmission device of the keyless-passive entry system, the interrogation signal having a first pulse transmitted at a first amplitude and a second pulse transmitted at a second amplitude where the second amplitude is greater than the first amplitude by at least a predetermined difference threshold;
receiving the interrogation signal by a portable communication device of the keyless-passive entry system;
determining, by the portable communication device if the second amplitude of the second pulse is greater than the first amplitude of the first pulse by at least the predetermined difference threshold; and
determining, by the portable communication device that the interrogation signal is an authorized interrogation signal in response to the determination that the received interrogation signal includes the first pulse transmitted at the first amplitude followed by the second pulse transmitted at a second amplitude where the second amplitude is greater than the first amplitude by at least a predetermined difference threshold.

2. The method of claim 1 wherein the step of receiving the interrogation signal by the portable communication device further includes the steps of measuring a relative amplitude of the first pulse, waiting for a predetermined period of time, and measuring a relative amplitude of the second pulse.

3. The method of claim 1 wherein the portable communication device is non-responsive to the interrogation signal if the second amplitude of the second pulse is not greater than the first amplitude of the first pulse by at least the predetermined threshold difference.

4. The method of claim 3 wherein the interrogation signal further includes data, the portable communication device determining the validation of the data within the interrogation signal.

5. The method of claim 4 wherein the portable communication device is non-responsive to the interrogation signal in response to the determination that the data within the interrogation signal is invalid.

6. The method of claim 4 wherein determining the validation of the data within the interrogation signal is performed after the determination is made that the second amplitude of the second pulse is greater than the first amplitude of the first pulse by at least the predetermined difference threshold.

7. The method of claim 4 wherein determining the validation of the data within the interrogation signal is performed concurrently with the determination of whether the second amplitude of the second pulse is greater than the first amplitude of the first pulse by at least the predetermined difference threshold.

8. The method of claim 4 wherein determining the validation of the data within the interrogation signal is performed prior to the determination of whether the second amplitude of the second pulse is greater than the first amplitude of the first pulse by at least the predetermined difference threshold.

9. The method of claim 1 further comprising the steps of broadcasting a response signal if a determination is made that the second amplitude of the second pulse is greater than the first amplitude of the first pulse by at least the predetermined difference threshold.

10. The method of claim 9 further comprising the steps of enabling access to the vehicle in response to receiving an authenticated response signal from the portable communication device.

11. The method of claim 1 wherein said interrogation signal comprises a low frequency signal.

12. The method of claim 1 wherein the first pulse and the second pulse are preceded by data pulses transmitted within the interrogation signal.

13. The method of claim 1 wherein the interrogation signal includes an intermediate pulse transmitted between the first pulse and the second pulse, wherein the portable communication device determines if an amplitude of the intermediate pulse is greater than the first amplitude of a first pulse by at least a second predetermined difference threshold.

14. The method of claim 13 wherein the portable communication device determines if the second amplitude of the second pulse is greater than the amplitude of the intermediate pulse by at least the second predetermined difference threshold.

15. The method of claim 1 wherein the interrogation signal includes a plurality of intermediate pulses transmitted between the first pulse and the second pulse, wherein the portable communication device determines if the amplitude of each respective intermediate pulse has an amplitude greater than a respective amplitude of a respective previous pulse by a second predetermined difference threshold.

16. A keyless-passive entry system for identifying unauthorized access to a vehicle, the system comprising:
a portable communication device carried by a user of a vehicle for accessing entry to the vehicle;
a vehicle based transmission device in communication with the portable communication device;
an interrogation signal broadcast by the vehicle based transmission device as a low frequency signal, the interrogation signal having a first pulse transmitted at a first amplitude followed by a second pulse transmitted at a second amplitude, the second amplitude is greater than the first amplitude by a predetermined difference threshold, the portable communication device receiving the interrogation signal broadcast from the vehicle based communication device, the portable communication device determines the interrogation signal is an authorized interrogation signal in response to a determination that the second amplitude of the second pulse is greater than the first amplitude of the first pulse by at least the predetermined difference threshold.

17. The keyless-passive entry system of claim 16 wherein the portable communication device includes a controller.

18. The keyless-passive entry system of claim 16 wherein the interrogation signal includes a delay between the first pulse transmitted at the first amplitude and the second pulse transmitted at the increased second amplitude.

19. The keyless-passive entry system of claim 16 wherein the first pulse and the second pulse include non-data pulses.

20. The keyless-passive entry system of claim 16 wherein the first pulse and the second pulse include data.

* * * * *